(12) United States Patent
Gee et al.

(10) Patent No.: US 6,421,607 B1
(45) Date of Patent: Jul. 16, 2002

(54) SYSTEM AND METHOD FOR DISTRIBUTED NAVIGATION SERVICE

(75) Inventors: Robert A. Gee, Tempe; Stanislaus Gonsalves, Elgin; Jeffrey Kohley; Mark McNulty, both of Carol Stream; James Blake Bullock, Gilbert, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/667,354

(22) Filed: Sep. 22, 2000

(51) Int. Cl.$^7$ ................................................. G01C 21/00
(52) U.S. Cl. ........................ 701/209; 701/211; 340/988
(58) Field of Search ................................ 701/209, 211, 701/25, 117, 118, 119, 201; 340/905, 988–995

(56) References Cited

U.S. PATENT DOCUMENTS 4,812,843 A * 3/1989 Champion, III et al. .... 340/905
5,760,713 A * 6/1998 Yokoyama et al. ......... 340/995

* cited by examiner

*Primary Examiner*—Yonel Beaulieu
(74) *Attorney, Agent, or Firm*—John J. King; Kevin D. Wills

(57) ABSTRACT

A distributed navigation system and method for providing driving instructions to a user. The system includes a service center having a navigation server and associated workstations. The service center stores driving instructions in a continuously updated map database. In response to a user request the instructions are transmitted by way of a wireless network to a client device residing in the user vehicle. The instructions are assembled into sequential stepwise driving directions and stored in a storage device in the client device. Commands from the user trigger playback of the driving instructions in a stepwise fashion.

18 Claims, 4 Drawing Sheets

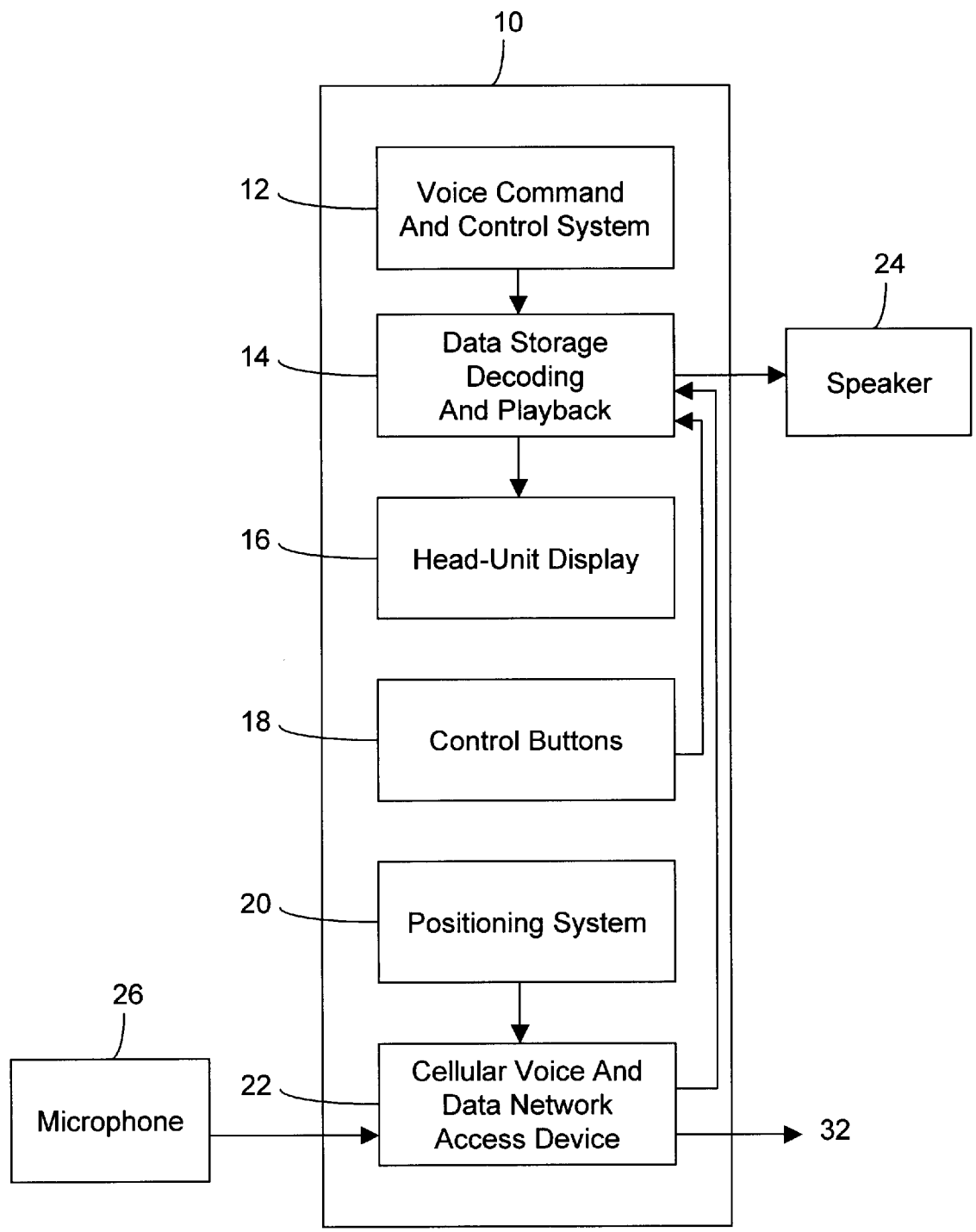

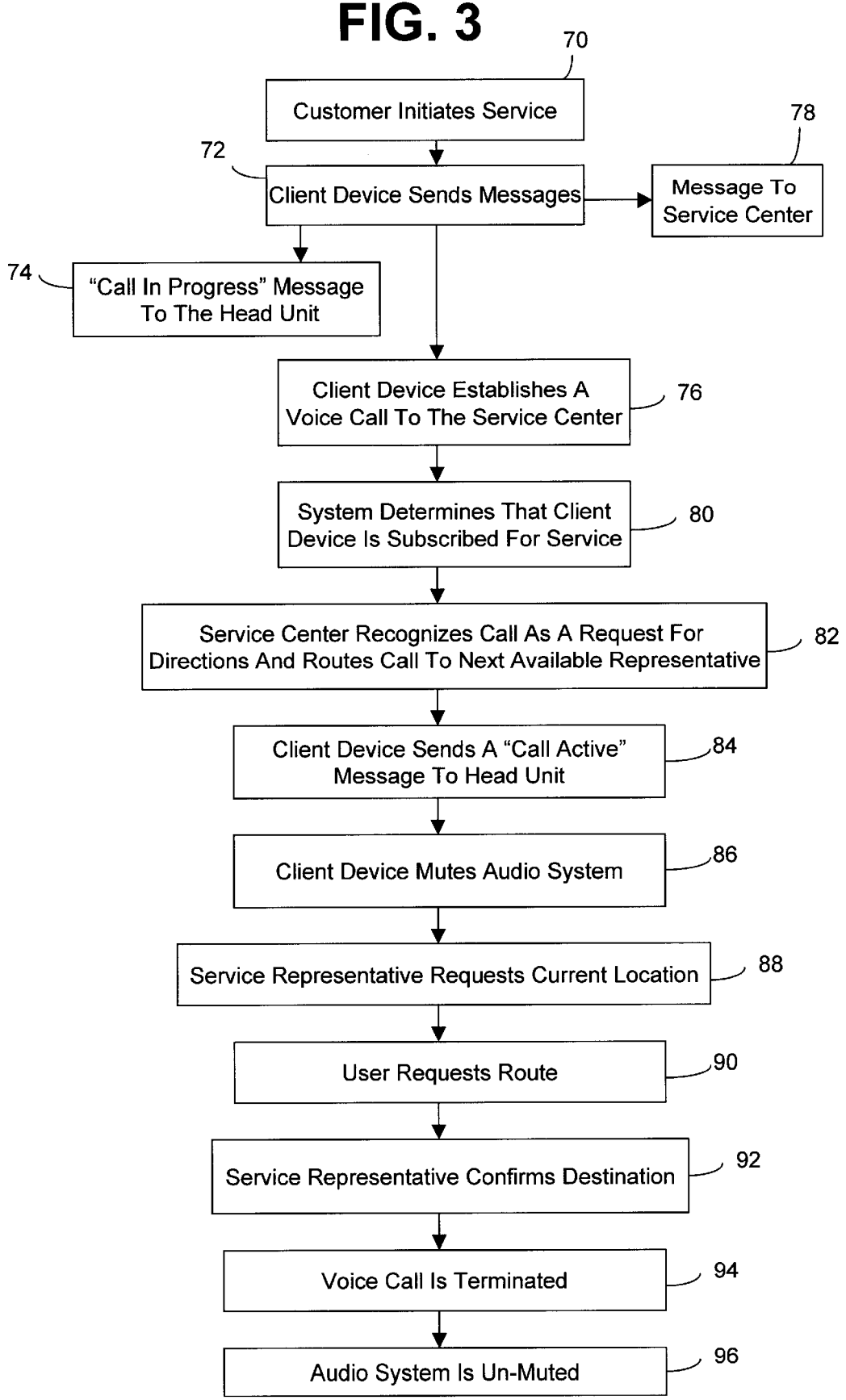

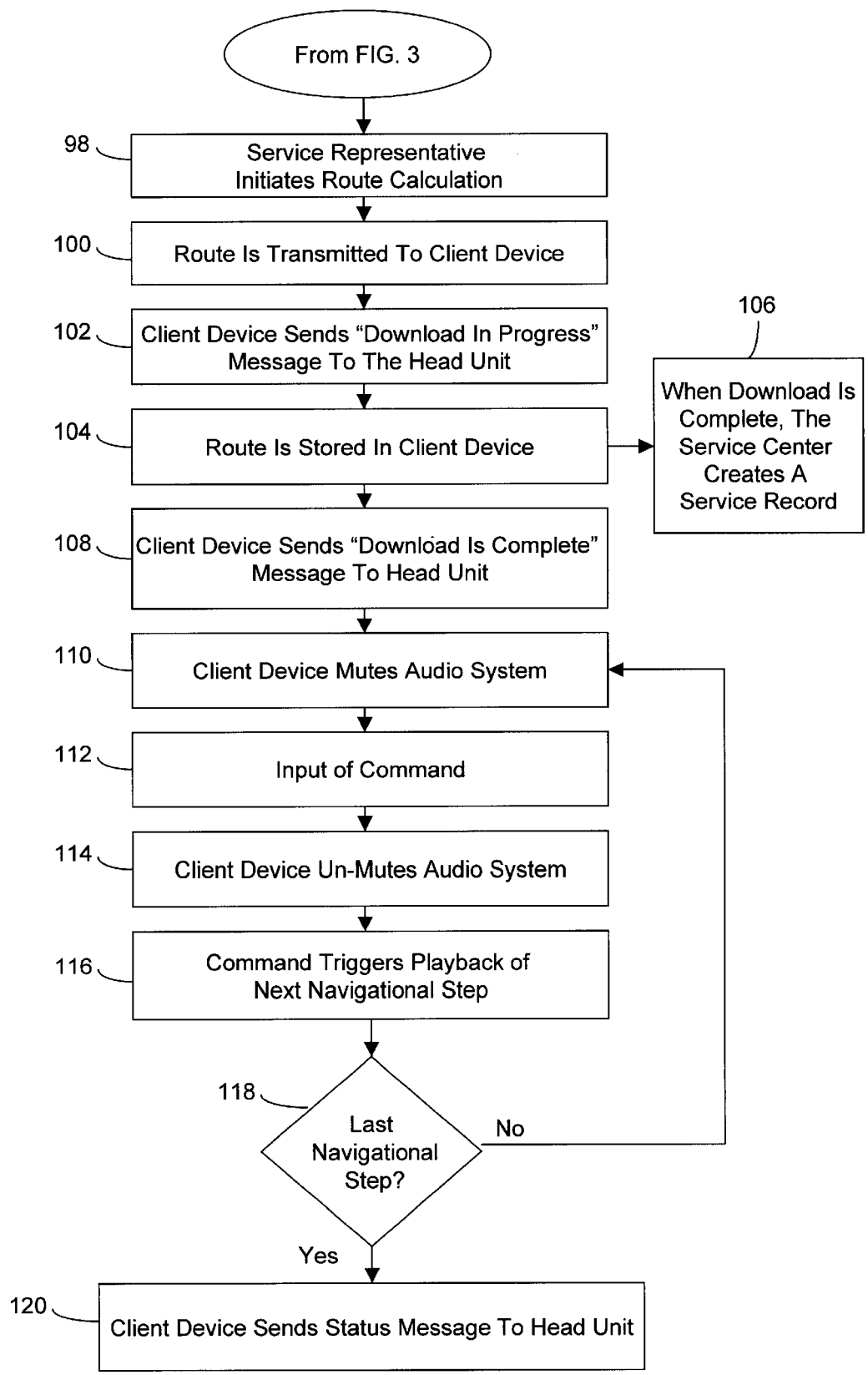

SYSTEM AND METHOD FOR DISTRIBUTED NAVIGATION SERVICE

FIELD OF THE INVENTION

The present invention generally relates to the field of navigation systems for automotive vehicles. More particularly, the invention is directed to a system for providing driving directions to a user and a method of operating the system.

BACKGROUND OF INVENTION

Vehicle operators need the ability to obtain accurate navigating directions from a current position without the difficulties of being connected to a service operator via a phone call. For example, being in continuous phone connection with an operator may contribute to reduced attentiveness to driving conditions. Likewise, operators at service centers need a system to quickly analyze the driver's vehicle position to deploy relevant and accurate directions in the shortest time possible.

A number of navigation systems exist that provide driving instructions to a user or operator of a motor vehicle. In general, these systems fall into two categories: autonomous or stand-alone systems, and systems that involve a communication link to a server or human operator.

Most autonomous systems are relatively high-cost devices that are designed to be permanently installed into a vehicle. The devices include map information, typically stored on a CD-ROM, and a means to relay that information to a user in speech or images. Typically, these systems utilize a device to determine the position of the vehicle. Many current vehicle navigation systems use a Global Positioning System (GPS). GPS includes NAVSTAR GPS and its successors, Differential GPS (DGPS), or any other electromagnetic wave positioning system. Such a GPS system can be used to calculate distance and direction traveled. Other systems used to calculate vehicle position include various sensors attached to the vehicle to measure the progress of the vehicle relative to a previously known position. This method of dead reckoning, however, is susceptible to sensor error, and therefore requires expensive sensors for accuracy and dependability.

Many types of on-board vehicle navigation apparatus having the ability to give navigational instructions in speech form have been suggested for the driver's convenience. With these types of on-board systems with oral navigation functions, a route from the current position to the destination is automatically determined based on the map data once the driver specifies the desired destination. When the vehicle approaches an intersection while traveling along the suggested route, an oral navigational instruction is given as to whether to turn right or left at the intersection.

Another example of an autonomous system includes implementation of a database and navigation system based on a laptop computer platform. This system includes a GPS unit for providing a position of the laptop computer. Driving instructions are provided by a text to voice converter that converts the text driving instructions into a voice signal. The instructions are output by the computer at a time based on the position of the vehicle and a time period required to speak the directions.

Other prior art systems include a wireless communication device with which a vehicle occupant retrieves driving instructions from a service representative or operator. In such a system, however, the operator does not have a system to quickly analyze the vehicle position. Further, either the operator must stay in voice contact with the vehicle user to continuously relay instructions to the user or the user must record the directions and then refer to them. However, reference to the recorded directions during driving may contribute to a dangerous driving situation.

Accordingly, it would be desirable to have a relatively low-cost navigation system whereby the operator of a vehicle could obtain and refer to accurate directions in a convenient format that overcomes the disadvantages described above. In particular, one embodiment of the method and system of the present invention provides vehicle operators the ability to obtain accurate driving directions from a current driving location by downloading up-to-date route information from a computer-based server in an audible format and output in response to voice commands.

BRIEF DESCRIPTION OF THE DRAWINGS

FIG. 2 is a block diagram of an embodiment of the client device of the present invention;

FIG. 3 is a flow chart of an embodiment of the method of operation of the present invention; and FIG. 4 is a flow chart of the embodiment continued from FIG. 3.

DETAILED DESCRIPTION OF THE PRESENTLY PREFERRED EMBODIMENTS

Figure 1:
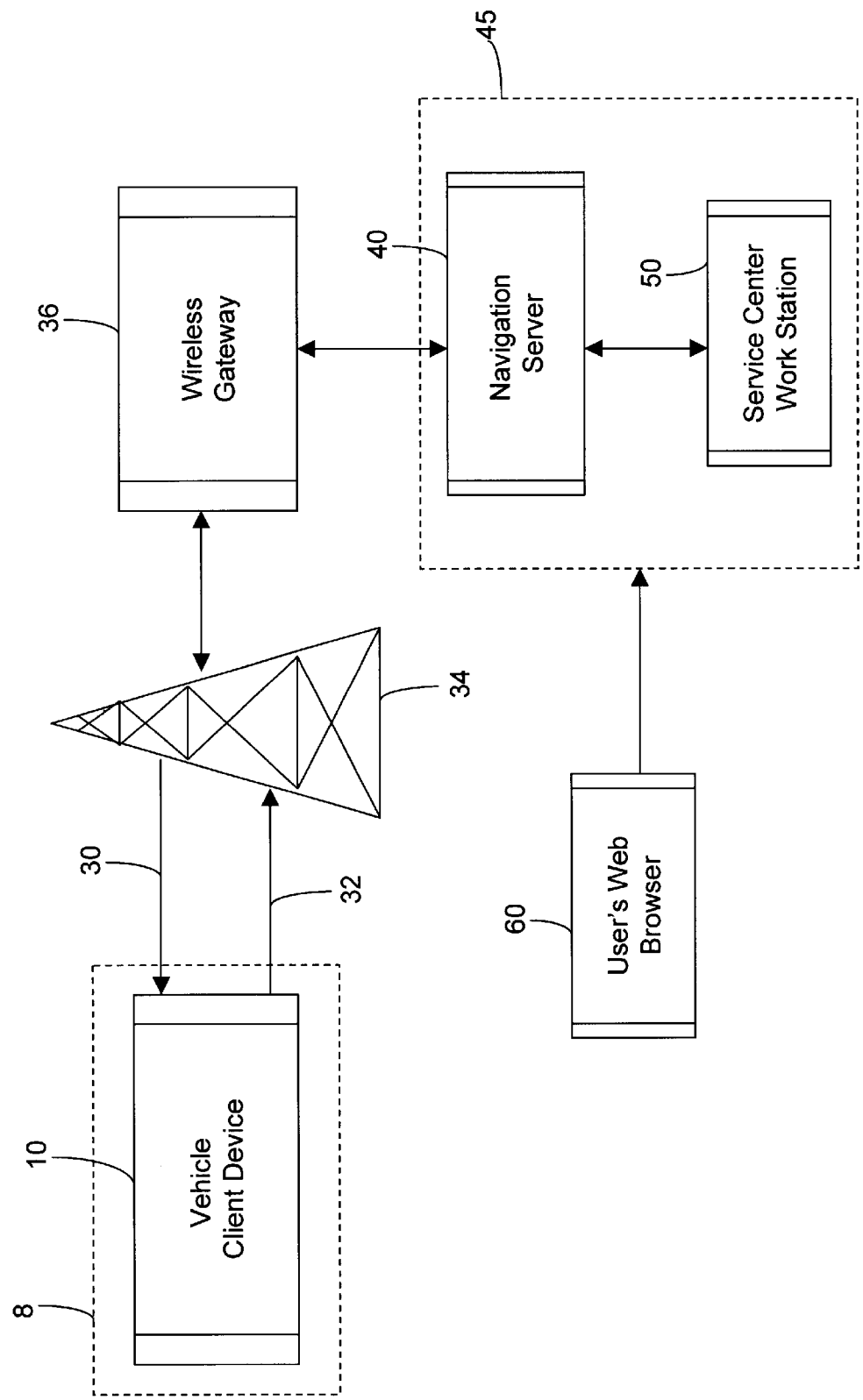
FIG. 1 is a block diagram of an embodiment of a navigation system of the present invention.

In the specification, the term "telematic device" or "client device" refers to a device which is generally equipped to receive, process and output information or the like to another device or a user. Historically, telematic devices receive and process digital data including sound, textual and graphic data as, for example, file transfer, electronic mail, facsimiles, electronic posts, data bank access, information center access, images, instructions and multimedia files. While early telematic devices operated in a wired network, many current devices receive data over a wireless network. It should be understood that the present invention contemplates telematic devices that receive data transmitted over a wireless network. Such devices and wireless networks are known in the art.

FIG. 1 is a block diagram generally depicting elements of an embodiment of the present navigation system. The system includes a client device 10 located in a vehicle 8. The client device 10 is a telematic unit that has the capability to transmit signals 32 and receive signals 30 through a wireless communication network or infrastructure 34 as well as several elements described in more detail below. A wireless gateway 36 directs signals to and from the wireless infrastructure 34 to a service center 45. The service center 45 includes a navigation server 40 and a service center workstation 50 and a device to transmit both data and voice information from the navigation server and workstation. The navigation server includes map and directional information. A human operator can operate the workstation 50, which is connected to the navigation server. The navigation server 40 may be accessible, preferably through Internet connection, by a user's web browser 60, so that the user may set route preferences, store common destinations and plan trips.

A vehicle client device 10 is located in the vehicle 8 (generally depicted by the dashed lines at reference character 8). As shown in more detail in FIG. 2, the client device 10 includes a voice command and control system 12. The voice command and control system 12 provides automatic voice recognition of voice communication from the user. The voice command and control system 12 processes voice communications to determine whether a spoken word or speech pattern matches any of the stored grammars or vocabulary. When the system 12 identifies a speech pattern, the system sends an output signal to implement the specific function associated with the specific pattern to the audio decoding and playback portion 14. Many or all of the functions capable of being effected by the voice command system 12 are capable of being controlled by control buttons 18 on the client device.

The client device 12 may include an audio decoding and playback portion 14. The audio decoding and playback unit 14 receives and stores digital information sent through the wireless infrastructure 34 from the navigation server 40. Audio information is decoded from the digital format and played back or outputted to a speaker in the client device 10 or the vehicle audio system or the like. The unit 14 may contain computer readable program code that plays the decoded information in a stepwise fashion in response to commands from the voice command and control system 10 or the control buttons 18 or a positioning system 20. It should be understood that the information stored in the client device 10 received from the service center 45 may contain textual information and other visual or graphic information. The textual information and other graphic information can be played in a stepwise fashion coinciding with the audio information. Graphic information, including textual information is displayed by the head unit display 16. The present invention includes the transmission of geocoded information, such as images, maps or pictograms. Also geocoded information may form a portion of the transmitted information including road-links and geographic properties or attributes such as latitude, longitude, house numbers or points of interest.

One embodiment of the present invention includes the retrieval of map information from the navigation server and providing driving instructions therefrom. The driving instructions, whether audio, textual or both, are assembled into discreet steps or sequential steps by computer readable program code in the navigation server 40. Each step represents a single navigational event such as "Turn west on Highway 66 and proceed for five miles." Each step is separated or identified by a keyword, symbol or indicator that the client device is designed to recognize as the end of an instructional step and the beginning of the next step. In this manner, the playback portion 14 of the client device 10 recognizes where to stop and begin playback of the stored instructions. In another words, the navigational information is stored in the client device with inserted indicators that act as pause indicators. The pause indicators are recognized by computer readable program code in the client device to trigger the playback portion of the client device to pause. Thus, after storing the instructions in the data storage portion 14 of the client device 10, the playback portion 14 responds to commands given by the user by playing back a portion of the driving instructions until a pause indicator is reached. Further, commands produce sequential stepwise playback of the instructions. Thus, the stepwise playback of navigational events involves recognition of a pause indicator, pausing the playback function, recognizing a command to proceed, replay (or other command) and playing the appropriate navigational step in response to the type of command.

The client device 10 includes a positioning system 20. In one embodiment, the positioning system 20 is a Global Positioning System (GPS). As discussed above, a GPS is used to determine a vehicle's position in the positioning system 20 as is known in the art. The positioning system 20 both determines the present position of the vehicle and transmits 32 the computed position to the service center 45 via the wireless infrastructure 34 through the cellular voice and data network access device 22. The cellular voice and data network access device 22 may be an imbedded cell phone and uses wireless communications standards such as AMPS, TDMA, CDMA, GSM, etc., in order to establish a voice and data connection through the wireless infrastructure and the wireless gateway 36 to the service center 45. The cellular voice and data network access device is well known in the art.

The wireless gateway 36 connects the wireless infrastructure to the service center 45. The service center 45 includes the navigation server 40 and the service center workstation 50. The navigation server 40 includes a database or storage device with map and direction information. The stored information may be updated to reflect current road and driving conditions. The update may be done automatically by real time connection to weather and traffic nodes via the Internet or similar connection. Updating or maintenance may also be performed by system administrators who input road and traffic conditions, and amend routes in view of construction and so on.

The user's web browser 60 may be used to access the navigation server 40 through the Internet. The navigation server 40 can provide user accessible password protected access through which the user may set route preferences, store common destinations and plan trips. When the user requests calculation of a route, the navigation server can access the user's preferences and compare the requested route to the stored preferences. In this manner, the server 40 supplies routes that are input and preferred by the user.

FIGS. 3–4 illustrate the method of operation of one embodiment of the present system, and also refer to aspects and elements of the invention shown in FIGS. 1 and 2. Referring to FIG. 3, the customer or user initiates the service 70 by using a push-to-talk button or the like located on the client device 10 located in the vehicle 8. The customer starts the service through the voice command and control 12 interface by speaking "Directions" after a voice prompt. The client device 10 can send a number of messages 72 including a "Call in Progress" message 74 to the head unit 16 to notify the user that the system is initiating contact with the service center 45. The client device also sends a message 78 to the service center 45 which includes one or more of the client device 10 position (using data obtained from the GPS unit 20), identification and type of call (i.e., a request for directions). The client device 10 also establishes a voice call 76 to the service center 45. Both the message 78 and the voice call 76 are sent by way of the cellular voice and data network access device 22 located in the client device 10.

The system determines whether the client device 10 is subscribed or authorized for service 80. Either the client device 10 or the service center 45 may accomplish the determination. The service center 45 recognizes the call as a request for directions and routes 82 the call to the next available service representative at a service center workstation 50. When the call is routed 82 to a service representative the system sends information regarding the type of call, the location of the client device 10 and the identification of the subscriber to the service center workstation 50. When the voice call becomes active the client device 10 sends a "Call Active" message 84 to the head unit 16. This notifies the vehicle user that the voice call is connected to a service representative. The client device 10 mutes 86 the audio system, i.e., the radio, tape player, CD player or the like.

Through the voice connection, the service representative requests the current location 88 of the vehicle to validate that the location given by the positioning system 20 is accurate and compares the verbal location with the location given by the positioning system 20. The user requests that the service representative calculate a route to a given destination 90. The service representative enters the destination 92 into the service center workstation 50 and requests that the user validate the destination. The service representative advises the user that the route will be calculated and downloaded to the client device 10. In an alternate embodiment (not shown), the requested destination may be input by keying a phone number with a keypad, or selecting a phone number, which characterizes the destination address. The destination information may be input from a portable computing device (PDA, Laptop) via a local wireless link.

The voice call is terminated 94 and the audio system is un-muted 96 so that the voice command and control system 12 becomes active. The service representative initiates route calculation 98 at the service center 45, which performs the task of calculating the route and inserting pause markers or indicators where necessary between the navigational steps and transmits the route 100 to the client device 10. While the transmission of the route takes place, the client device 10 sends a "Download in Progress" message 102 to the head unit 16 to inform the user that the route is being downloaded. The route is stored 104 in the client device 10 in the data storage portion 14 and the data connection is terminated. The client device 10 sends a "Download is Complete" message 108 to the head unit 16 to inform the user that the route is stored in the client device and is available for playback. At approximately the same time, the service center creates a service record 106.

Steps 110–118 involve the playback of the navigational instructions and are performed as a loop until the user arrives at the final destination. After the download is complete, the client device 110 mutes the audio system to prevent accidental triggering of the command system and provides for the input of commands by the user.

In one embodiment, the commands are voice commands made by the user, which as detailed above are interpreted by the voice command and control system. The client device 10 un-mutes 114 the audio system and in response to a command 112, plays 116 the appropriate navigational step. Triggering playback and/or display of the navigational steps 116 outputs the downloaded media in one or more of audio, textual and graphic forms. In other words, the information is played/and or displayed to the user as audible instructions, textual instructions, graphical symbols, pictograms, images or the like by the client device 10. The commands contemplated for effecting playback of a navigational step include, but are not limited to: NEXT, PREVIOUS, SAY AGAIN, REPEAT, STOP, and CONTINUE.

In another embodiment, the commands are input by the user actuating control buttons 18 or the like on the client device 10. The control buttons have similar designations as the verbal commands.

In yet another embodiment, the commands to effect playback of the next navigational step are signals from the positioning system 20. The method of triggering voice based route guidance based on signals from a position detector (GPS) is well known in the art.

When the vehicle plays back the last navigational step 118, the client device 10 sends a status message 120 to the head unit 16.

The present invention may be embodied in other specific forms without departing from its spirit or essential characteristics. The described embodiments are to be considered in all respects only as illustrative and not restrictive.

We claim:

1. A method of operating a navigation system for a vehicle comprising:
    determining an initial position of the vehicle;
    initiating a wireless request for service, the request including transmission of the initial position of the vehicle;
    establishing a voice connection, the voice connection providing transmission of a desired position of the vehicle;
    wirelessly receiving, by the vehicle, a calculated route from the initial position to the desired position, wherein the calculated route is in a media format capable of being provided in a stepwise sequential fashion in response to commands; and
    storing the received calculated route.

2. The method of operating the navigation system of claim 1 wherein at least one of playing and displaying the calculated route in the stepwise sequential fashion takes place in response to the commands.

3. The method of operating the navigation system of claim 2 wherein the commands are verbal commands from an occupant of the vehicle.

4. The method of operating the navigation system of claim 2 wherein the commands are generated by actuating buttons.

5. The method of operating the navigation system of claim 2 wherein the commands are generated by a positioning device.

6. The method of operating the navigation system of claim 1 wherein the request includes the identification of the vehicle.

7. The method of operating the navigation system of claim 6 wherein the request including the identification of the vehicle is used to validate that the vehicle is a current subscriber for the navigation system.

8. The method of operating the navigation system of claim 1 wherein the media format includes audio information.

9. The method of operating the navigation system of claim 1 wherein the media format includes textual information.

10. The method of operating the navigation system of claim 1 wherein the media format includes geographic properties.

11. The method of operating the navigation system of claim 1 wherein a service record is created when the transmittal of the route is complete.

12. A navigation system for a vehicle for providing navigational instructions to a user comprising:
    positioning determining means for determining an initial position of the vehicle;
    initiating means for wirelessly initiating a request for service, the request including transmission of the initial position of the vehicle;
    establishing a voice connection, the voice connection providing transmission of a desired position of the vehicle;
    receiving means for wirelessly receiving, by the vehicle, a calculated route from the initial position to the desired position, wherein the calculated route is in a media format capable of being provided in a stepwise sequential fashion in response to commands; and
    storage means for storing the received calculated route.

13. The navigation system of claim 12, further comprising:
    formating means for formatting the calculated route into a format adapted to be provided in a stepwise sequential fashion;

route calculation means for calculating a route from the initial position to the desired position to produce the calculated route;

transmitting means for wirelessly transmitting the calculated route to the vehicle;

command and control means for decoding the calculated route into at least one of voice, textual, and graphic data; and output means responsive to the command and control means for outputting the decoded data.

14. The navigation system of claim 13 wherein data stored in the storage means is adapted to be output in a stepwise manner in response to commands from the command and control means.

15. The navigation system of claim 13 wherein the route calculation means and the formatting means are included in a service center, the service center further comprising a navigation server and associated workstations, the navigations server including a computer storage device having map information and a database for storing user information, the workstations being connected to the navigation server to provide access to the map information and user information, and the service center including communication means for communicating data voice information to and from the vehicle.

16. Computer usable media storing a program in a navigation system for a vehicle comprising:

computer readable program code that receives navigating instructions in at least one of an audio, a textual and a graphic media, formats the instructions into discreet steps; and computer readable program code that receives and stores the formatted instructions and outputs the instructions to an associated output device in a stepwise fashion in response to commands.

17. The navigation system of claim 12 further comprising a display means for displaying the output from the output means in a stepwise sequential fashion.

18. The navigation system of claim 12 further comprising a playback means for playing back at least a portion of calculated route in response to commands.

* * * * *

UNITED STATES PATENT AND TRADEMARK OFFICE
CERTIFICATE OF CORRECTION

PATENT NO. : 6,421,607 B1
DATED : July 16, 2002
INVENTOR(S) : Axel Fuchs et al.

It is certified that error appears in the above-identified patent and that said Letters Patent is hereby corrected as shown below:

Title page,
Item [75], Inventors, reads "Robert A. Gee, Tempe; Stanislaus Gonsalves, Elgin; Jeffrey Kohley; Mark McNulty, both of Carol Stream; James Blake Bullock, Gilbert, all of AZ (US)" and it should read -- Axel Fuchs, Park Ridge, IL (US); Robert A. Gee, Tempe, AZ (US); Stanislaus Gonsalves, Elgin, IL (US); Jeffrey Kohley; Mark McNultey, both of Carol Stream, IL (US); James Blake Bullock, Gilbert, AZ (US) --

Signed and Sealed this

Seventh Day of September, 2004

JON W. DUDAS
*Director of the United States Patent and Trademark Office*